June 6, 1967  W. M. GRUBER ET AL  3,323,218
EXTENSOMETERS

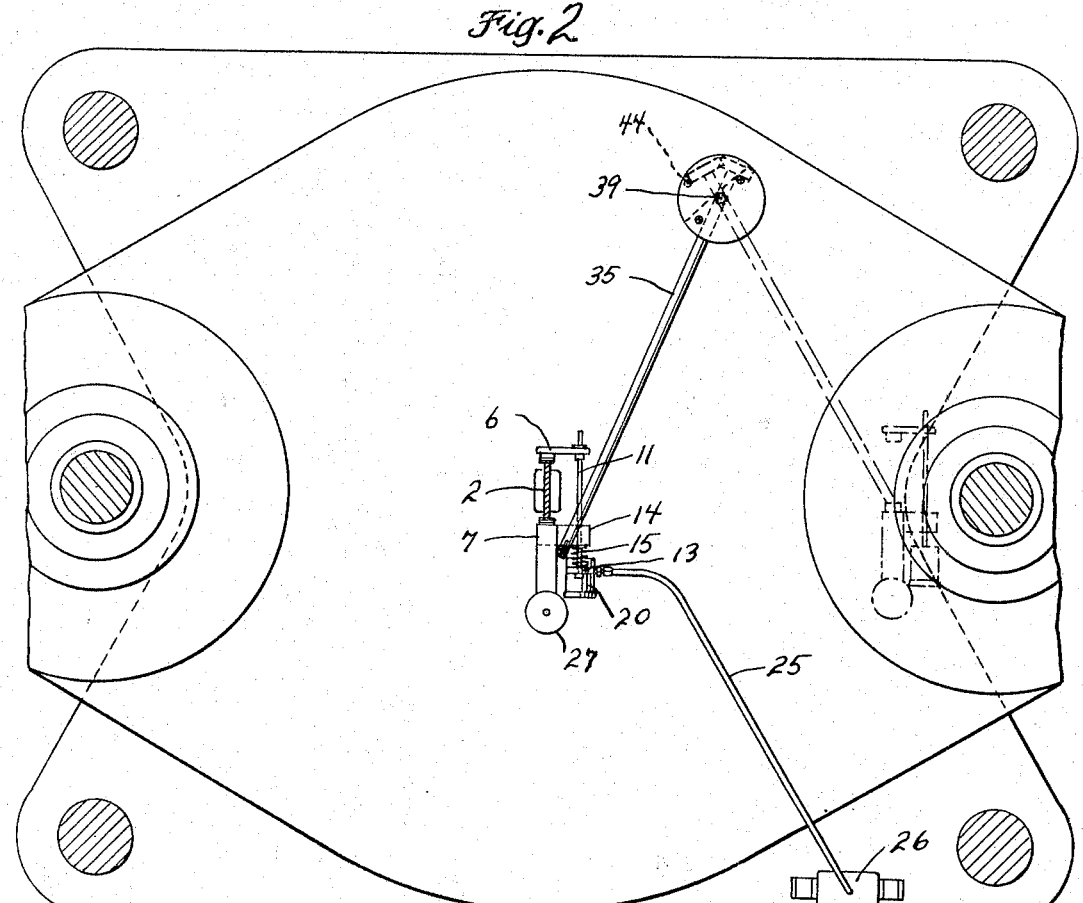
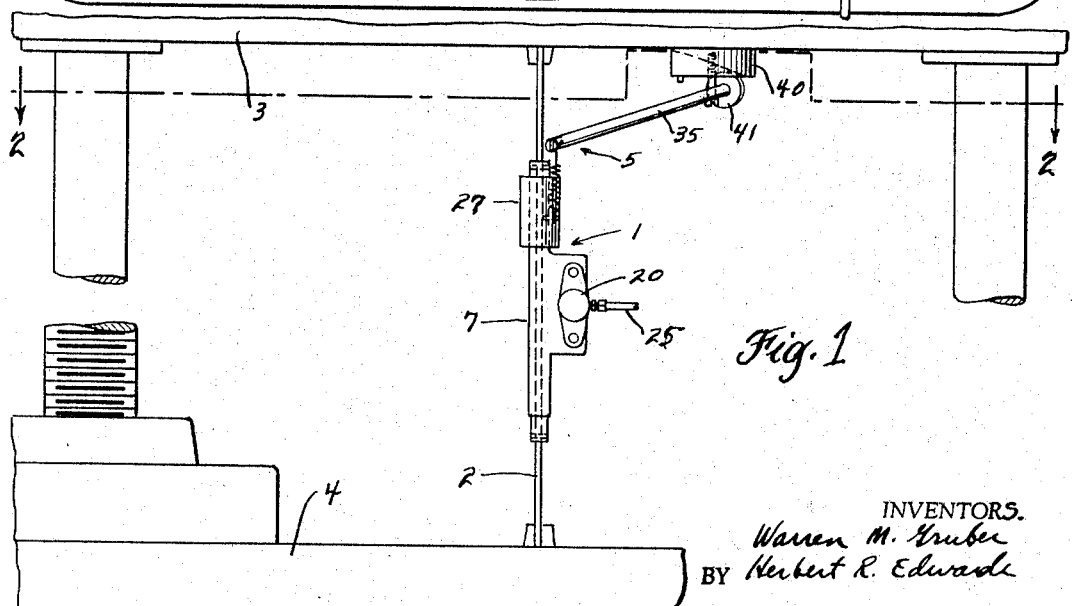

Filed June 7, 1965  2 Sheets-Sheet 2

INVENTORS
Warren M. Gruber
BY Herbert R. Edwards

Synnestvedt & Lechner
ATTORNEYS

3,323,218
EXTENSOMETERS
Warren M. Gruber, West Rock Hill Township, Bucks County, and Herbert R. Edwards, Oreland, Pa., assignors to Tinius Olsen Testing Machine Company, Willow Grove, Pa., a corporation of Pennsylvania
Filed June 7, 1965, Ser. No. 461,774
8 Claims. (Cl. 33—148)

This invention in general relates to materials testing equipment and in particular relates to improvements in extensometers.

The invention contemplates an improved extensometer for use in those instances where it is desired to remove the extensometer during a test. For example, where the specimen is of a nature that the forces developed during rupture would cause damage to the instrument.

For such purposes the invention contemplates extensometer structure which provides for the instrument to be automatically released and swung away from the specimen to a position wherein it is held suspended from the testing machine.

A preferred form of the invention will be described below in connection with the following drawings, wherein:

FIGURE 1 is a front elevational view of an extensometer constructed in accordance with the invention and supported on a test specimen;

FIGURE 2 is a plan view taken along the lines 2—2 of FIGURE 1;

In FIGURE 1 the instrument 1 is mounted on a test specimen 2 supported between the relatively movable cross heads 3 and 4 of a conventional universal testing machine. The general structure of universal testing machines is well known by those skilled in the art and further comments on the same are believed unnecessary.

The instrument 1 includes support mechanism generally indicated by 5 which is connected to the cross head 3. Those parts of the device which are mounted on the test specimen are adapted to be automatically released and then moved by the support mechanism away from the specimen to the position indicated by the dotted line in FIGURE 2. In this position the instrument is suspended from the cross head 3 and is spaced far enough from the specimen so that upon rupture it will not be damaged.

Figure 3:
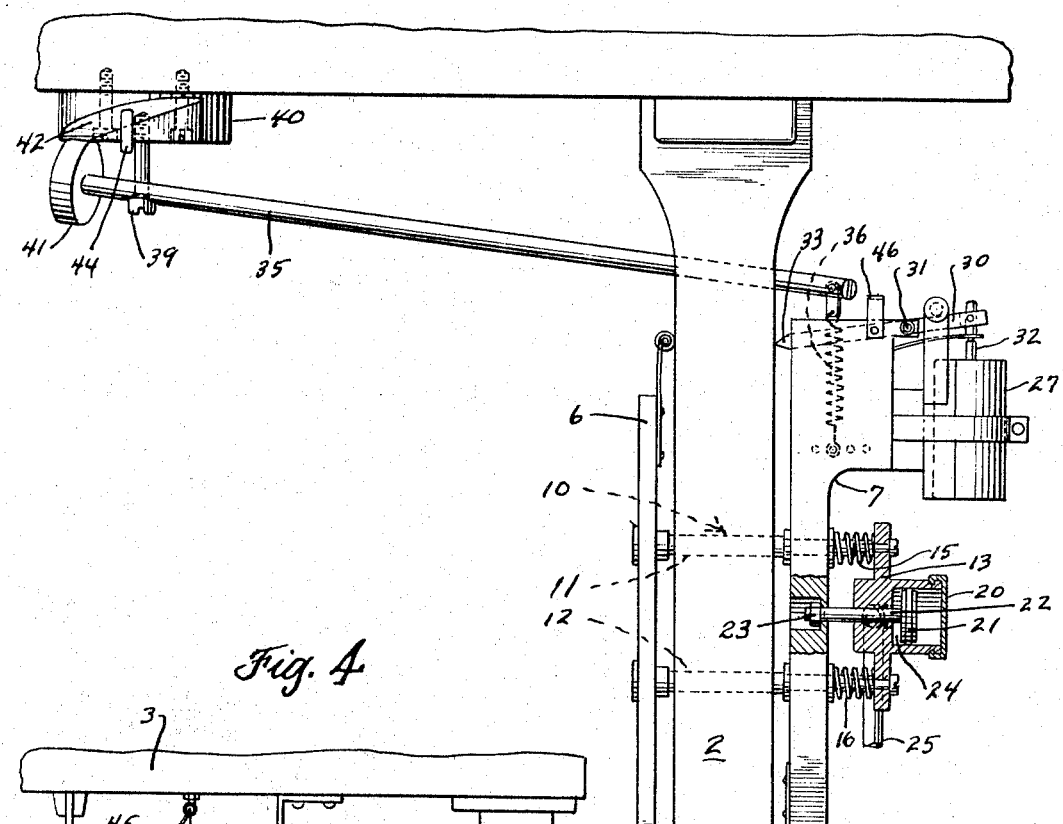
FIGURE 3 is an enlarged, side elevational view looking toward the right in FIGURE 1 with certain parts in section.

With particular reference to FIGURES 2 and 3, it will be seen that the instrument has a pair of jaws 6 and 7 engaging opposite sides of the test specimen 2. A U-shaped frame 10 has legs 11 and 12 and cross piece 13. The legs 11 and 12 are fixed to the jaws 6 and are slidably mounted by means of apertures in the extension 14 (FIG. 2) of the jaw 7. Between the jaw 7 and the cross piece 13 are the springs 16 and 15 which urge the jaws 6 and 7 in a direction toward one another. The springs 15 and 16 generate sufficient force so that when the jaws are in the position as shown in FIGURE 3, the jaws are clamped on the test specimen.

For releasing that part of the instrument mounted on the specimen, a reciprocating motor is connected between the frame 10 and the jaw 7 to develop a counterforce to the springs 15 and 16 and move the jaws in a direction away from one another.

As shown, a reciprocating motor takes the form of a piston and cylinder arrangement, the cylinder 20 being formed on the cross piece 13 and the piston 21 being reciprocately mounted in the cylinder. The piston has a stem 22 which is fixedly secured to the jaw 7 as by the nut means 23. The chamber 24 in the cylinder is interconnected to a flexible line 25 which, as seen in FIGURE 2, is connected to a solenoid operated valve 26. When the valve 26 is energized in one direction, fluid, preferably air, is admitted to the cylinder 24 and when the valve is energized in the opposite direction, the line 25 and the cylinder 24 are connected to exhaust. The valve 26 is manually or automatically controlled.

When air is admitted to the chamber 24, the cross piece 13 is moved to the left to overcome the force of springs 15 and 16. The legs 11 and 12 also move to the left and cause the jaw 6 to disengage the specimen. With jaw separation, the instrument is released.

The jaw 7 carries the conventional extensometer coil and core elements (not shown) disposed within the housing 27. Lever 30 is connected by the pivot 31 to the jaw 7 and also pivotedly connected to the core stem 32. The lever 30 has a knife edge 33 which engages the specimen. Preferably the second knife edge is provided on the jaw 6 as indicated at 34. The two knife edges, of course, determine the gauge length.

After that part of the instrument mounted on the specimen is released, it is moved away from the specimen. One form of mechainsm for this is the mounting mechanism 5. This includes the rod 35, one end of which is connected by a spring 36 to the jaw 7. The other end of the rod 35 is connected by a universal pivot means 39 to the cross head 3. The pivot 39 provides limited universal motion so that the rod is free to rotate as between the positions indicated by the full and dotted lines in FIGURE 2 and also rotate in a vertical direction. The other end of the rod also carries the roller 41 which engages a cam track 42 formed on the disk 40. The disk 40 is fixed to cross head 3.

As indicated, the cam track 42 surrounds the pivot means 39 and is inclined upwardly. When the jaws 6 and 7 are released, the weight of the jaws and the other connected parts tend to move the rod downwardly so that the roller bears upwardly against the inclined surface. In doing so, the roller moves up and around the track 42. This combined motion causes the jaws, etc. to swing down and away from the specimen and move to the position shown by the dotted lines in FIGURE 2.

We have included a bumper 44 on the track 42 which limits the travel of the roller and determines the outward position of the rod. This is indicated in FIGURE 2 where it will be seen that the roller 41 is in engagement with the abutment 44.

Figure 4:
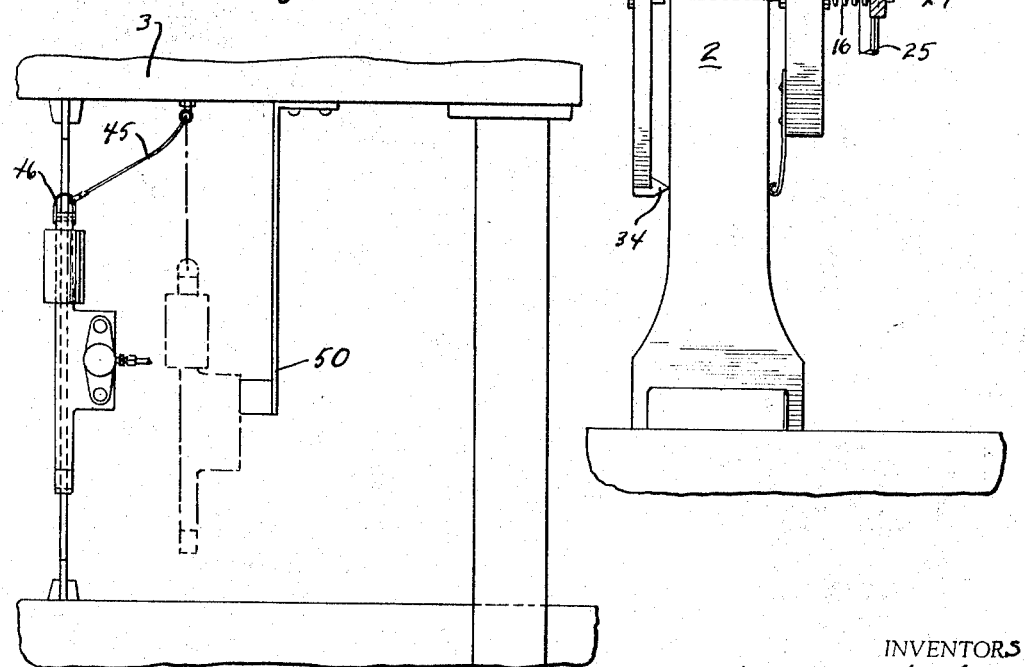
FIGURE 4 is a front elevational view of a modified form of the extensometer of the invention.

In lieu of the arrangement shown in FIGURES 2 and 3, the invention also contemplates flexible cable for moving the jaws and connected parts away from the specimen and suspending the same in a position spaced away from the specimen. This arrangement is shown in FIGURE 4 where it will be seen that the flexible cable 45 is connected to the cross head 3 to a yoke 46 on the jaw 7. When the jaws are released from the specimen, the connected parts fall away, but being supported by the cable 45, move to the position shown in the dotted lines in FIGURE 4. In order to avoid excessive swinging of the instrument, we have provided a bumper means 50 which is connected to the cross head 3 and is adapted to engage the jaws as they swing away from the specimen.

We claim:

1. In a testing machine having a pair of relatively movable cross heads supported on a frame, an extensometer combination comprising:

a pair of jaws engaging the opposite sides of a test specimen supported between the cross heads;
relatively movable coil and core elements mounted on one of said jaws;
a lever arm engaging the test specimen and pivotally connected with said one jaw and with said core;
a frame fixed to one of said jaws;
spring means between said frame and the other of said jaws and exerting a force to cause the jaws to move toward one another, said force being effective to clamp the jaws on the specimen;
fluid piston-cylinder means respectively connected between said frame and the other of said jaws;
means to inject fluid into said cylinder for causing relative motion between the piston and cylinder in a direction to overcome the force of said spring means and cause the jaws to move away from one another and thereby release the combination from the specimen; and
means connected between one of said jaws and one of said testing machine cross heads to provide for the combination to move away from the specimen upon said release and also to suspend the combination from the testing machine frame when so released.

2. In a testing machine having a pair of relatively movable cross heads supported on a frame, an extensometer combination comprising:
a pair of jaws engaging opposite sides of a test specimen supported between the cross heads;
relatively movable coil and core elements mounted on one of said jaws;
a lever arm engaging the test specimen and pivotally connected with said one jaw and with said core;
a frame fixed to one of said jaws;
spring means between said frame and the other of said jaws and exerting a force to cause the jaws to move toward one another, said force being effective to clamp the jaws on the specimen;
reciprocating motor means connected between said frame and the other of said jaws and movable to cause said jaws to move away from one another and thereby release the combination from the specimen; and
means connected between one of said jaws and one of said testing machine cross heads to provide for the combination to move away from the specimen upon said release and also to suspend the combination from the testing machine frame when so released.

3. A construction in accordance with claim 2 wherein last said means includes a flexible cable connected between said one jaw and the testing machine cross head.

4. In a testing machine having a pair of relatively movable cross heads supported on a frame, an extensometer combination comprising:
a pair of jaws engaging opposite sides of a test specimen supported between the cross heads;
relatively movable coil and core elements mounted on one of said jaws;
a lever arm engaging the test specimen and pivotally connected with said one jaw and with said core;
a frame fixed to one of said jaws;
spring means between said frame and the other of said jaws and exerting a force to cause the jaws to move toward one another, said force being effective to clamp the jaws on the specimen;
reciprocating motor means connected between said frame and the other of said jaws and movable to cause said jaws to move away from one another and thereby release the combination from the specimen;
a rod;
means connecting one end of said rod to one of said jaws;
pivot means on the other end of said rod and rotatably connecting the rod with one of said testing machine cross heads, the rotation providing for said one end of the rod to move toward and away from a test specimen;
a roller mounted on said other end of the rod; and
mechanism mounted on said cross head and forming a cam track surrounding said pivot means, the track being inclined so that the weight of the combination, when released from the specimen, will cause the roller to run along the track and thereby cause the rod to rotate and move the combination away from the specimen.

5. A construction in accordance with claim 4 wherein said means connecting one end of the rod to the jaws includes a spring.

6. A construction in accordance with claim 4 including abutment means on the track to limit the motion of the roller therealong.

7. In a testing machine having a pair of relatively movable cross heads supported on a frame, an extensometer combination comprising:
extensometer coil and core elements having mechanism supporting the same on a test specimen;
a rod;
means connecting one end of said rod to said mechanism;
pivot means on the other end of said rod and rotatably connecting the rod with one of said testing machine cross heads, the rotation providing for said one end of the rod to move towards and away from the test specimen;
a roller mounted on said other end of the rod; and
mechanism mounted on said cross head and having a cam track surrounding said pivot means, the track being inclined so that the weight of the extensometer coil and core elements and their support mechanism, when released from the specimen, will cause the roller to run along the track and thereby cause the rod to rotate and move the combination away from the specimen.

8. In a testing machine having a pair of relatively movable cross head supports on a frame, an extensometer combination comprising:
a pair of jaws engaging opposite sides of a test specimen supported between the cross heads;
relatively movable coil and core elements mounted on one of said jaws;
a lever arm engaging the test specimen and pivotally connected with said one jaw and with said core;
means to force the jaws into said engagement with the specimen including a reciprocating motor to move the jaws out of said engagement; and
means connected between one of said jaws and one of said testing machine cross heads to provide for the combination to move away from the specimen upon said release and also to suspend the combination from the testing machine frame when so released.

References Cited

UNITED STATES PATENTS

| 2,578,066 | 12/1951 | Hyde | 33—148 |
| 2,611,966 | 9/1952 | Rebmam | 33—148 |
| 2,768,447 | 10/1956 | Strimel | 33—148 |
| 2,910,778 | 11/1959 | Strimel | 33—148 |
| 2,941,298 | 6/1960 | Huyser | 33—148 |

LEONARD FORMAN, *Primary Examiner.*

W. D. MARTIN, *Assistant Examiner.*